UNITED STATES PATENT OFFICE.

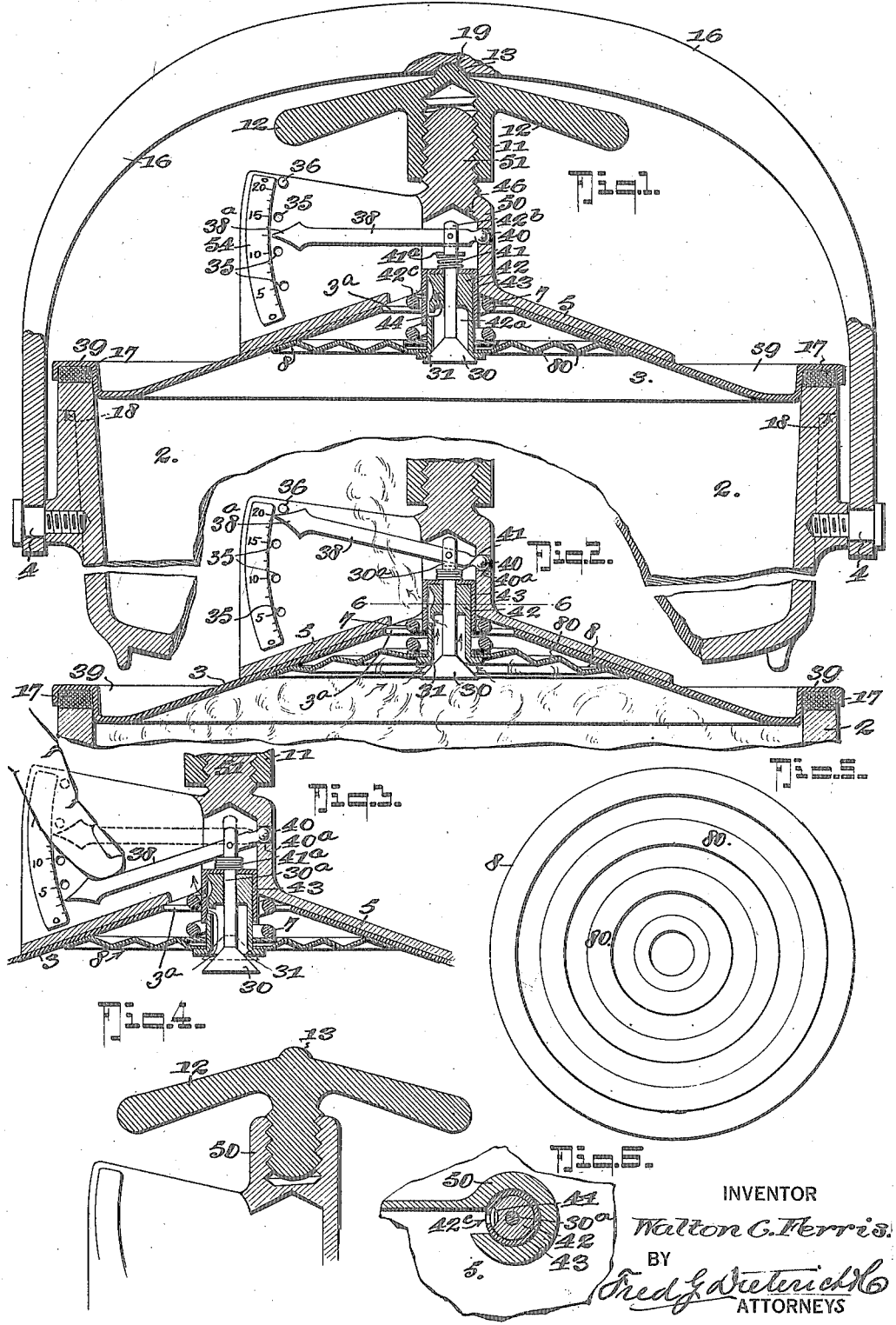

WALTON C. FERRIS, OF LINCOLN, NEBRASKA, ASSIGNOR TO NATIONAL MANUFACTURING COMPANY, OF LINCOLN, NEBRASKA, A CORPORATION.

STEAM-PRESSURE COOKER.

1,273,347.

Specification of Letters Patent. Patented July 23, 1918.

Application filed October 17, 1917. Serial No. 197,103.

*To all whom it may concern:*

Be it known that I, WALTON C. FERRIS, a citizen of the United States, residing at Lincoln, in the county of Lancaster and State of Nebraska, have invented certain new and useful Improvements in Steam-Pressure Cookers, of which the following is a specification.

My present invention has reference to that class of pressure cookers in which is included means for holding a cover tight down on the utensil against internal steam pressure and primarily my said invention has for its purpose to provide, in a pressure cooker, an improved means for clamping the cover to the top of the utensil or kettle, of a simple and economical character and which can be conveniently and expeditiously manipulated for adjusting the clamping elements for holding the cover down against the predetermined pressure and which shifts to permit the lift of the cover when the internal pressure rises above the predetermined pressure for which the said clamping means have been especially provided.

Another object of my present invention, is to provide in a cooker of the character stated, an improved combined safety valve and danger signal, in which the signaling means is actuated under a considerable excess of steam being generated within the cooker, whereby to give the operator warning.

Again, my present invention embodies an improved pressure gage coöperative with an improved blow-off valve construction and which includes a gage member that forms a convenient means, whereby the operator can unseat the blow-off valve, as desired.

With other objects in view that will hereinafter appear my invention embodies, in a pressure cooker of the general character stated, certain features of construction and peculiar combination of parts, all of which will be first described in detail, specifically pointed out in the appended claims and illustrated in the accompanying drawings, in which:

Figure 1 is a vertical section of a cooking utensil or kettle with my improvements applied, the safety valve being at the closed position.

Fig. 2 is a vertical section of the top part of the kettle with the cover and the clamping means therefor applied, the safety valve and the operating gage being shown at the position when the safety valve is open and the signal device is at the "whistling" point.

Fig. 3 is a similar view, the finger control of which being shown as shifted to unseat the safety valve.

Fig. 4 illustrates a slightly modified construction of the adjusting screw and nut members that form a part of the cover clamping means.

Fig. 5 is a plan view of the flexible diaphragm hereinafter referred to.

Fig. 6 is a detail horizontal section on the line 6—6 on Fig. 2.

In carrying out my present invention, I provide a bail shaped handle 16, the arms of which are pivotally attached to the opposite sides of the kettle or utensil 2 by pivot screws 4—4, see Fig. 1. The bail 16, in practice, is heavy enough to hold a pressure, say thirty pounds and resilient enough to allow leakage above that pressure as the cover lifts off the kettle rim 18.

3 designates a cover having a central aperture $3^a$, the body of which is of the usual dome or dish shape and, in my construction, it has an inverted cup shape rim 39 that fits over and protects a pliable gasket ring 17 and keeps the said ring 17 from blowing out under ordinary usage of the cooker.

8 denotes a slightly bulged diaphragm having preferably ring-like or annular corrugations 80 to increase its flexibility and the said diaphragm is attached to the central under side or dome of the cover 3 under the central aperture $3^a$ in any suitable manner.

A cap 5 is mounted on the cover 3 directly over the diaphragm 8 and is stationary with the said cover.

Centrally of the diaphragm is an upright bearing 42 that extends up through the aperture $3^a$ in the cover the lower end of which is in the nature of a tube $42^a$ which extends through and is soldered or otherwise secured to the diaphragm 8 and has its lower end shaped into a valve seat 31 which is best shown in Figs. 1, 2 and 3, by reference to which it will be also seen that a puppet valve 30 engages the said seat 31 and includes a stem $30^a$ that passes through a central bore in the bearing 42 and through a sleeve 43, presently again referred to, and the upper end of the said stem is extended and forked as at 42ᵇ to receive the inner end of a gage lever 38 that pivotally joins on the said stem extension. Valve 30 is normally held up to the valve seat 31 by a coil spring 41 located on the stem extension between the sleeve 43 and a cross pin 41ᵃ, as shown.

The cap 5, before referred to, has a central vertically extended hub-like post 50 which, in the construction shown in Figs. 1 and 2, terminates in a screw 51 for engaging the internally threaded hub 11 of a winged nut 12 provided with a central bearing 13 that works against the seat 19 in the bail shaped handle 16.

Instead of forming the winged nut 12 with a hollow hub 11 for receiving the screw 50 on the cap 5, the parts may be reversed as shown in Fig. 4, which illustrates the screw as a part of the winged member 12 and the threaded hub formed in the post 50 of the cap 5.

The winged nut or screw 11 has preferably four diverging wings or members 12 so that if two opposite wings 12 are directly under the handle or bail 16, the other two are in position for being turned. By resting the hands on the bail 16 and turning the wings 12 with the thumbs, the nut or screw 11 may be easily and forcibly tightened against the bail 16 for producing the desired steam tight joint between the cover rim, the gasket 17 and the rim 18 of the kettle 2.

The gage lever 38 that is pivotally joined with the stem of the puppet valve has its inner end fulcrumed as at 40 in a socket 40ᵃ in the cap post 50, as shown.

The outer end of the lever 38 terminates in a gage finger 36ᵃ and the said finger is adapted for traversing a scale plate 54 attached to a bracket that extends vertically from the cap 5 and laterally of the cap post 50, as is clearly shown in the drawings and the said scale plate is stepped off to indicate pressures, say of five, ten, fifteen and twenty pounds and, at each scale division, the bracket portion of the cap 5, has a socket 35 for receiving a removable stop 36 with which the gage finger portion 38ᵃ of the lever 38 engages, see Fig. 2, which shows the stop 36 as located at the twenty pound pressure point.

7 designates a compression spring located between the diaphragm 8 and the cap 5 that tends to bulge the diaphragm 8 inwardly at atmospheric pressure.

*Operation of the safety valve.*—As pressure is raised within the cooker, it is apparent that the diaphragm 8 will be forced outwardly against the pressure of the spring 7 and at such outward movement of the said diaphragm, the puppet valve remains seated or closed until the predetermined internal pressure is reached when the finger 38ᵃ of the lever 38 bumps the stop 36, or the stem of the valve bumps the seat 46 in the post 50 which effects the unseating or opening of the puppet valve 30 from its seat 31, the said valve remaining to the last mentioned or open position until the internal pressure has lowered to less than the aforesaid predetermined pressure. The stop 36 may be readily set at the different positions 35— 35—35.

While I have shown and described the diaphragm 8, the spring 7, the cap 5 and the lever 38 used in common with the safety valve and the pressure gage, the said safety valve and pressure gage portion of the completed structure may be made separately, if desired.

In assembling the several parts into operative condition, the sleeve 43 is slipped over a concavity 44 in the tubular member 42 forming a whistle.

When the safety valve is "blowing off" through the exhaust 42ᶜ in the tubular member 42, a mere trifle of the escaping steam will not affect the whistle sufficiently to make a loud noise but, when a considerable excess of steam is being generated within the cooker, the steam blowing off through the exhaust 42ᶜ, under pressure, renders the "whistle" alive for giving warning to the operator.

The lever 38, which is readily shifted for unseating the valve 30 also has for its purpose to indicate the pressure within the cooker, since under varying pressures it acts as an indicator finger for designating the steam pressure within the cooker.

From the foregoing description taken in connection with the drawings, the complete construction, the manner of operation and the advantages of my invention will be apparent to those skilled in the art to which my invention belongs.

What I claim is:

1. A safety valve mechanism, said mechanism comprising a normally extended flexible diaphragm subject to the steam pressure within the cooker, a valve seat, a puppet valve movable with the diaphragm and normally held closed against the valve seat, a blow-off normally closed as the diaphragm and the valve move together under steam pressure less than that for which the valve is set for being opened, and means coöperative with the valve that shifts the valve to the open position when the steam pressure exceeds the predetermined point, whereby to open the steam space to atmosphere through the blow-off.

2. A safety valve mechanism, said mechanism comprising a normally extended flexible diaphragm subject to the steam pressure within the cooker, a valve seat, a puppet valve movable with the diaphragm and normally held closed against the valve seat, a blow-off normally closed as the diaphragm and the valve move together under steam pressure less than that for which the valve is set for being opened, means coöperative with the valve that shifts the valve to the open position when the steam pressure exceeds the predetermined point, so as to open the steam space to atmosphere through the blow-off, the said last mentioned means including a stop with which the valve stem engages at predetermined times.

3. A safety valve mechanism, said mechanism comprising a normally extended flexible diaphragm subject to the steam pressure within the cooker, a valve seat, a puppet valve movable with the diaphragm and normally held closed against the valve seat, a blow-off normally closed as the diaphragm and the valve move together under steam pressure less than that for which the valve is set for being opened, means coöperative with the valve that shifts the valve to the open position when the steam pressure exceeds the predetermined point, whereby to open the steam space to atmosphere through the blow-off, the said means including an adjustably mounted stop and a gage lever pivotally mounted on the cover that engages the upper end of the valve stem and includes a finger portion adapted for engagement with the adjustable stop.

4. In a pressure cooker of the character stated, a blow-off mechanism in communication with the steam space of the utensil and including a tube having an escape port, a safety valve movable in the tube and which normally closes the said tube from the steam chamber and a pressure indicator comprising a pivoted lever resting on the puppet valve and adapted for being manually shifted to unseat the said valve.

5. A safety valve mechanism comprising a normally extended diaphragm subject to the internal pressure of the cooker, a valve seat, a puppet valve movable with the diaphragm and normally held closed against the said valve seat, a blow-off normally held closed by the valve as the diaphragm with the valve moves under a pressure less than that for which the valve is set and means for coöperating with the valve to shift it to the open position when the internal steam pressure exceeds the predetermined point, whereby to open the steam space to atmosphere through the blow-off.

6. In a pressure cooker, in combination with a kettle; a centrally apertured cover, a hub-like post on the cover located over the central aperture thereof, a normally extended flexible diaphragm attached to the inside of the cover, the said diaphragm being subjected to the steam pressure within the cooker, a tubular upright attached to and projected from the diaphragm into the hub-like post, a sleeve mounted on and movable with the upright, the said tube and the sleeve having communicating blow-off passages, the tubular upright having a valve seat, a puppet valve normally held closed under steam pressure coöperating with the said seat, the said valve including a stem that has movement through the tubular upright and the sleeve, the said sleeve and the tubular upright moving together under excess pressure on the diaphragm and means coöperating with the valve stem and the hub-like upright for engaging the valve stem and forcing it and the valve back to an open position for bringing the blow-off passages into communication with the pressure chamber of the kettle.

7. In a pressure cooker, in combination with a kettle; a centrally apertured cover, a hub-like post on the cover located over the central aperture thereof, a normally extended flexible diaphragm attached to the inside of the cover, the said diaphragm being subjected to the steam pressure within the cooker, a tubular upright attached to and projected from the diaphragm into the hub-like post, a sleeve mounted on and movable with the upright, the said tube and the sleeve having communicating blow-off passages the tubular upright having a valve seat, a puppet valve normally held closed under steam pressure coöperating with the said seat, the said valve including a stem that has movement through the tubular upright and the sleeve, the said valve and the tubular upright moving together under excess pressure on the diaphragm, means coöperating with the valve stem and the hub-like upright for engaging the valve stem and forcing it and the valve back to an open position for bringing the blow-off passages into communication with the pressure chamber of the kettle, the said means consisting of a finger member fulcrumed at one end on the hub-like upright, pivotally connected to the valve stem and projected laterally with respect to the said stem and upright whereby the down pressure on the said finger tends to open the puppet valve.

8. In a pressure cooker, in combination with the kettle; a centrally apertured cover, a hub-like post on the cover located over the central aperture thereof, a normally extended flexible diaphragm attached to the inside of the cover, the said diaphragm being subjected to the steam pressure within the cooker, a tubular upright attached to and projected from the diaphragm into the hub-like post, a sleeve mounted on and movable with the upright, the said tube and the sleeve having communicating blow-off passages, the tubular upright having a valve seat, a puppet valve normally held closed under steam pressure coöperating with the said seat, the said valve including a stem that has movement through the tubular upright and the sleeve, the said valve and the tubular upright moving together under excess pressure on the diaphragm, means coöperating with the valve stem and the hub-like upright for engaging the valve stem and forcing it and the valve back to an open position for bringing the blow-off passages into communication with the pressure chamber of the kettle, the said means consisting of a finger member fulcrumed at one end on the hub-like upright, pivotally connected to the valve stem and projected laterally with respect to the said stem and upright whereby the down pressure on the said finger tends to open the puppet valve, the blow-off passage in the tubular bearing including a whistle producing cavity.

9. In a pressure cooker, a normally extended diaphragm subjected to internal steam pressure, a tubular bearing mounted on the diaphragm and having a valve seat, a sleeve mounted on and movable with the said bearing, the said sleeve and the bearing having alining steam passages, a valve normally engaging the valve seat in the bearing and including a stem freely movable in the alining apertures in the bearing and the sleeve, the bearing and the sleeve having coengaging blow-off passages, the passage in the bearing including a whistle producing cavity, the said valve, the bearing and the sleeve moving together under pressure below that for which the valve is set to open, and means for opening the valve when the pressure exceeds the predetermined point.

WALTON C. FERRIS.